UNITED STATES PATENT OFFICE.

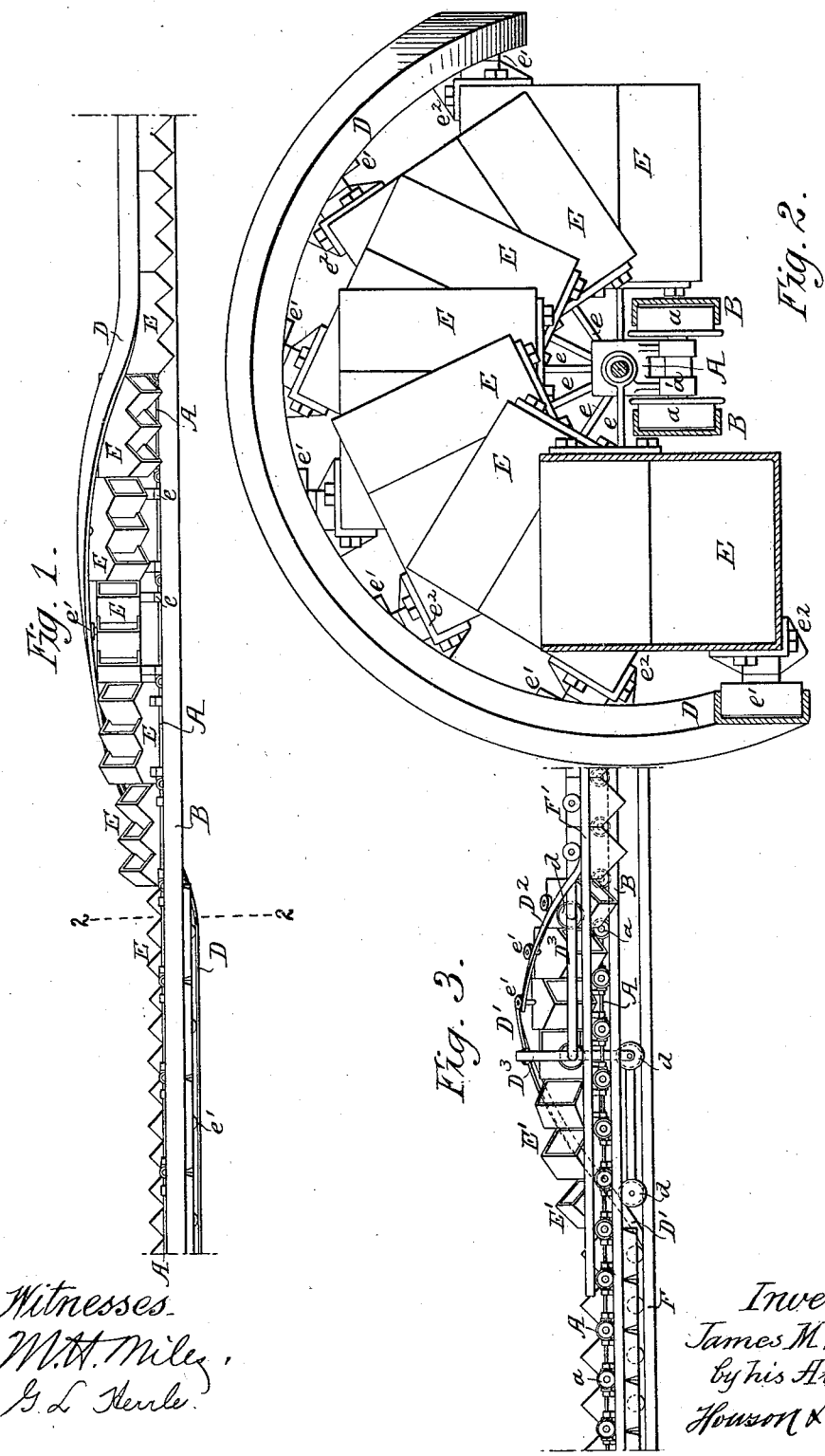

JAMES M. DODGE, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

DISCHARGE DEVICE FOR CONVEYERS.

SPECIFICATION forming part of Letters Patent No. 703,903, dated July 1, 1902.

Application filed February 6, 1901. Serial No. 46,218. (No model.)

*To all whom it may concern:*

Be it known that I, JAMES M. DODGE, a citizen of the United States, residing in Philadelphia, Pennsylvania, have invented certain Improvements in Discharge Devices for Conveyers, of which the following is a specification.

My invention relates to certain improvements in discharge mechanism for pivoted-bucket conveyers of the type in which the buckets are pivoted to the chain and hung to one side thereof and arranged so as to swing on the chain as a pivot, as fully set forth in the patent granted to me on the 12th day of February, 1901, No. 667,975.

The object of my invention is to provide means for discharging the contents of such a bucket while traveling on a run which is horizontal or substantially horizontal.

My invention may be used either on an elevating conveying apparatus, a horizontal conveyer, or an inclined conveyer.

In the accompanying drawings, Figure 1 is a side view of sufficient of a conveying apparatus to illustrate my invention. Fig. 2 is a section on the line 2 2, Fig. 1. Fig. 3 is a side view of an adjustable discharge device.

Referring to Figs. 1 and 2, A is a conveyer-chain of the type clearly shown in the above-mentioned patent, having links pivoted together and having brackets $a'$, carrying the wheels $a\ a$, which travel in the channel-rails B B, acting as a guide in the present instance. Pivoted to the chain A by brackets $e\ e$ is a series of buckets or carriers E, these buckets being arranged on one side of the chain and are so pivoted thereto that they can swing on the chain as a pivot. The conveyer can be either made in the form of an endless elevating-conveyer having upper and lower runs, as in the patent mentioned above, or may be a horizontal or inclined conveyer, as it is obvious that the device for discharging material from the buckets may be applied to any of the forms above mentioned providing the run at the point of discharge is horizontal or substantially horizontal, so that when the bucket is tipped its contents will be discharged. The discharge device for turning the buckets so as to discharge their contents is simply a rail or guide D, curved over the conveyer-chain, and this rail is in such position as to engage rollers $e'$ or projections on brackets $e^2$, secured to the buckets E, so that when the conveyer traverses the carrying-rail the wheels successively strike the curved rail D, and the buckets E are thereby carried over the chain A, about which the brackets turn, and the contents of each of the buckets are thus caused to be discharged into any suitable hopper or other receptacle. The buckets may remain in the reversed position until they come to the charging-point, or they may be returned to the position with their mouths uppermost immediately after discharging their contents.

In Fig. 3 I have shown the curved discharge-rail made adjustable longitudinally, so as to discharge the buckets $E'$ at any point desired. The frame $D^3$ carries two plain rails $D'$ and $D^2$, taking the place of the channel-rail which may be used, and this frame has wheels $d$, arranged to travel on rail F F', forming not only the support for the frame $D^3$, but also a continuation of the rails $D'\ D^2$, respectively.

In Fig. 1 the curved channel-rail D is continued on each side of the discharge-point, forming a guide or support for the outer side of the buckets, and obviously a plain rail, as F F', Fig. 3, may be used as a support in place of the channel-rail in the construction shown in Fig. 1.

It will be understood that while I have shown two independent rails B B these rails may be connected together or may be formed as a single rail, and likewise the rail D, which is shown as a single rail in Fig. 2, may be made in two or more pieces, without departing from my invention.

By the above construction it will be seen that I provide a simple and effective discharging device which will discharge the contents of the buckets by turning them around or about the chain as a pivot when the chain reaches a discharge-point, which may be on a horizontal run or a run substantially horizontal, so that when the buckets are turned over they will be discharged, and the buckets will be under control at all times.

What I claim is—

1. The combination in a conveyer having a horizontal or a substantially horizontal run, of a chain, a bucket pivoted longitudinally thereon so as to swing around the chain, with means for turning the buckets to discharge the material contained therein when the said buckets are on such horizontal or substantially horizontal run, substantially as described.

2. The combination in a discharge device for an endless-chain conveyer having a horizontal or substantially horizontal run, of a chain, a bucket pivoted longitudinally thereon so as to swing laterally around the chain, means for turning the bucket laterally on the chain so as to reverse it, said bucket being turned from the position with its mouth uppermost to an inverted position while on a run which is horizontal or substantially horizontal, substantially as described.

3. The combination in a discharge device for an endless-chain conveyer having a horizontal or substantially horizontal run, of a chain, a series of buckets pivoted thereto, a guide for the chain, a guide curved over the chain, a projection on each bucket engaging with said curved guide so as to turn the buckets laterally on the chain as a pivot to discharge the contents of the buckets while on a horizontal or substantially horizontal run, substantially as described.

4. The combination in a conveyer, of a chain, a bucket pivoted longitudinally thereon so as to swing around the chain, with means for turning the bucket to discharge the material contained therein, said means being longitudinally adjustable with respect to the conveyer, substantially as described.

In testimony whereof I have signed my name to this specification in the presence of two subscribing witnesses.

JAMES M. DODGE.

Witnesses:
WILL. A. BARR,
JOS. H. KLEIN.